Feb. 1, 1966  R. EICHENAUER  3,232,309

METHOD OF AND APPARATUS FOR TIRE INFLATING AND TESTING

Filed Aug. 21, 1962  3 Sheets-Sheet 1

INVENTOR
RUDOLF EICHENAUER

BY Kurt Kelman

AGENTS

United States Patent Office 3,232,309
Patented Feb. 1, 1966

3,232,309
METHOD OF AND APPARATUS FOR TIRE
INFLATING AND TESTING
Rudolf Eichenauer, Hollbergstrasse 1,
Frankfurt am Main, Germany
Filed Aug. 21, 1962, Ser. No. 218,297
19 Claims. (Cl. 137—224.5)

This invention relates to automatic control devices for adjusting the pressure of a fluid in a container to a predetermined value, and more particularly to automatic devices for inflating or deflating the pneumatic tires of vehicle wheels to a predetermined pressure value.

In its more specific aspects, the invention is concerned with improved apparatus of the type generally disclosed in my U.S. Patent No. 2,818,081, issued December 31, 1957.

An object of the invention is the provision of tire inflating or deflating and testing apparatus which automatically starts inflating or deflating a tire as soon as the same is attached to the device.

Another object is the provision of apparatus of the type referred to which performs accurately regardless of the length of conduit employed to connect a tire to the automatic inflating or deflating device proper. It is particularly desired to prevent premature automatic termination of the inflation operation before the tire actually reaches the desired pressure.

A further object is an apparatus including pressure sensitive indicating and/or controlling elements which are not subjected to pressure changes greater than those occurring in the tire while the tire pressure is being adjusted. I wish particularly to avoid a dropping back of a pressure gage reading between successive readings of tire pressure while the tire pressure is being adjusted stepwise to the predetermined value. Such a dropping back of readings and corresponding changes in the condition of other pressure sensitive devices unfavorably affect the performance of the pressure sensitive device and increases the time required for sensing the pressure.

Yet another object is apparatus which permits a plurality of tires to be inflated or deflated simultaneously to the same internal pressure.

The exact nature of this invention as well as other objects and advantages thereof will be readily apparent from consideration of the following specification relating to the annexed drawings in which.

Figure 3:
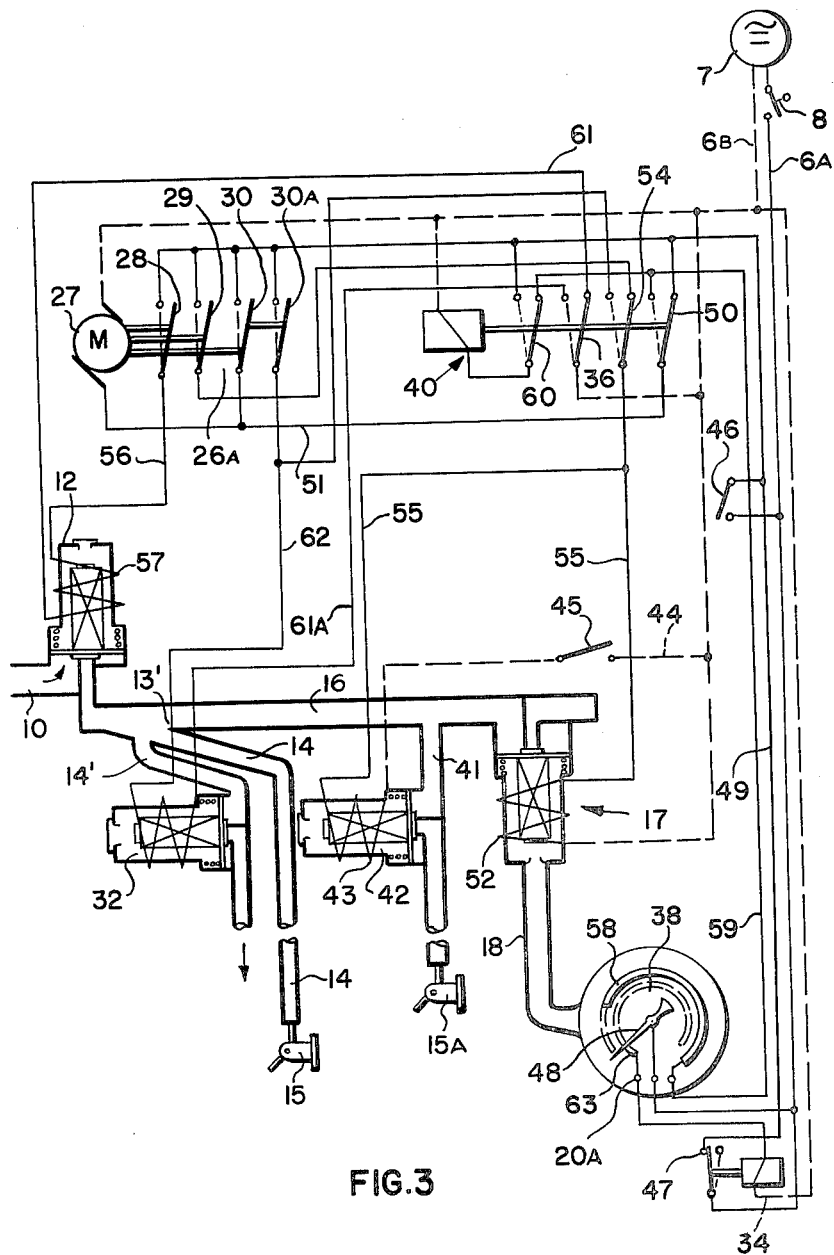
FIG. 3 is a diagram of the electrical and pneumatic circuits of a device of the invention capable of simultaneously and automatically inflating or deflating a plurality of tires to a predetermined uniform pressure, and for indicating the pressure within the tires.
Figure 4:
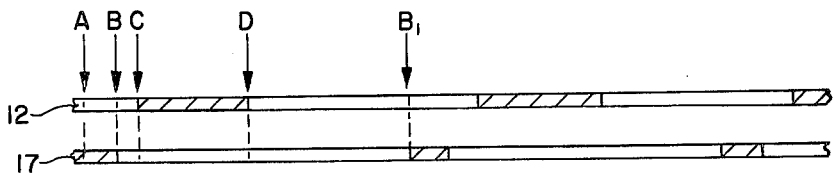
Figure 5:
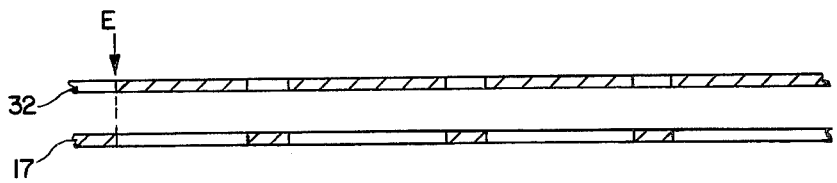
Figure 6:
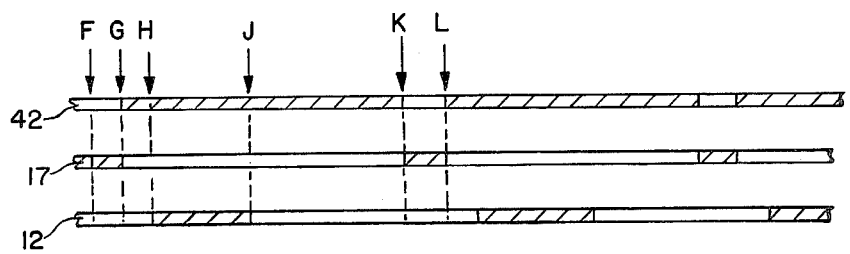

FIG. 4 diagramamtically illustrates the positions of a testing valve and a tire inflation control valve during one phase of the operation of the device of FIG. 3;

FIG. 5 similarly illustrates the positions of the testing valve and of a tire deflation control valve during another phase of the operation of the device of FIG. 3; and FIG. 6 represents the positions of a testing valve and of two tire inflation control valves during the first mentioned phase of operation of the device of FIG. 3 when the same is employed for simultaneous inflation of two tires.

Figure 1:
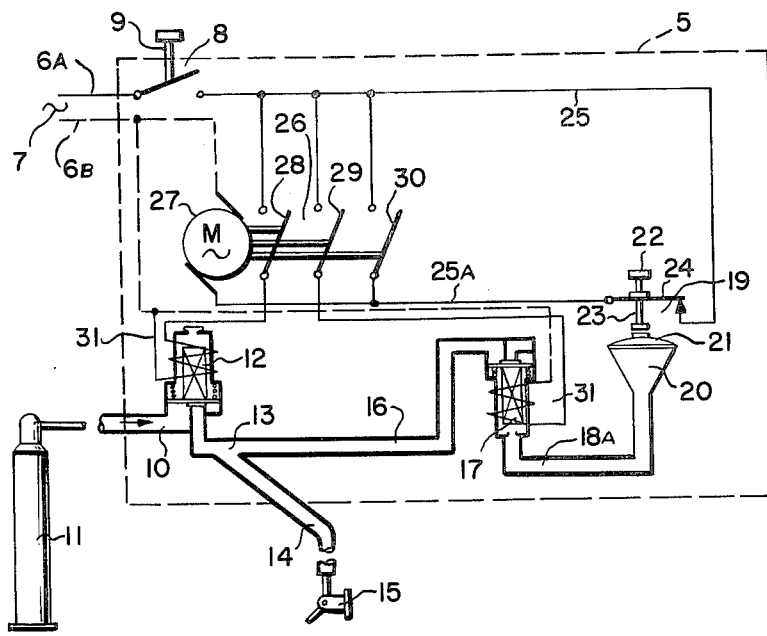
FIG. 1 is a diagram of the electrical and pneumatic circuits of a device of the invention for automatically inflating tires to a predetermined pressure.

Referring now to the drawing in detail, and initially to FIG. 1, there is shown a control device for automatically inflating a tire of a motor car or the like to a predetermined pressure. The control elements of the apparatus are mounted on a support 5 which may be box shaped and enclose the control elements. The necessary operating power is supplied by two conductors 6a and 6b from an external source 7 of electrical current, preferably alternating current.

The conductor 6b constitutes a common return lead for the several electrically operated elements of the control device, and may be a ground connection integral with the suport 5. The power lead 6a is connected to a normally open main switch 8 which may be closed manually by depressing the push button 9.

A hose line 10 supplies air under pressure to the control elements from a source of compressed air represented by a storage tank 11. The line 10 is connected to a solenoid operated normally closed valve 12 on the support 5. The valve controls admission of compressed air to a manifold 13. A first branch conduit 14 leads from the manifold 13 to a conventional push-on connector 15 adapted to make a sealing connection with a tire valve while holding the tire valve in the open condition.

A second branch conduit 16 connects the manifold 13 with another solenoid operated valve 17 normally open to connect the manifold with a conduit 18 leading to the pressure chamber 20 of an adjustable, normally closed, fluid-pressure operated, single throw switch 19 of conventional type. One wall of the pressure chamber 20 is formed by a resilient membrane 21. The switch 19 has a movable contact 24 on which a threaded pin 23 is adjustable toward and away from the membrane 21 by rotation of a head 22 of the pin. Sufficient pressure within the chamber 20 causes the membrane to move the pin 23 and thereby to lift the movable contact 24 from the fixed contact of the switch 19.

The operation of the valves 12, 17 is controlled by a timing switch 26 having a synchronous alternating current motor 27 which actuates opening and closing of three switch elements 28, 29, and 30 in timed sequence by means of a conventional gear transmission and of a rotary cam. Since the motion transmitting train for actuating the switch elements is well known in itself and will be fully understood from the description of the operation of the apparatus, it has not been further illustrated.

A conductor 25 connects the main switch 8 to the fixed contacts of the switch elements 28, 29, 30 and of the pressure sensitive switch 19. The movable contact of the latter is connected to the movable contact of the switch element 30 and to one terminal of the motor 27 by a conductor 25a. The movable contacts of the switch elements 28, 29 are connected to respective first terminals of the solenoid coils 31 and 31a of the valves 12, 17. Second terminals of the motor 27 and of the valves 12, 17 are grounded.

The apparatus illustrated in FIG. 1 permits a tire attached to the connector 15 to be inflated to a predetermined pressure whereupon the flow of compressed air is shut off automatically. The apparatus is operated as follows:

The desired tire pressure is set by adjusting the position of the pin 23 on the contact 24. The tire is attached to the connector whereby the tire pressure is transmitted to the chamber 20. The pressure being lower than desired, the membrane 21 does not open the switch 19.

The push button 9 is depressed, and the motor 27 of the timing switch is energized. It sequentially operates the valves 12, 17 as follows:

The switch element 29 is closed, whereby the coil 31a is energized and the valve 17 is closed. This valve will be referred to hereinafter as the testing valve. Shortly after closing of the testing valve, the switch element 28 is closed and the coil 31 of the valve 12 is energized. The valve 12 will be referred to as the inflation control valve. It admits compressed air to the manifold 13 and thereby to the tire attached to the connector 15. The switch element 28 then is closed. With both valves 12, 17 closed, the pressure within the entire branch conduit 14, the manifold 13, and the conduit 16 is permitted to equalize with that within the tire. If the conduit 14 is relatively long and narrow, the time period required may be of the order of several seconds, and the timing switch 26 has to be equipped with a cam suitably selected according to the dimensions of the conduit 14.

After pressure equalization, the testing valve 17 is briefly opened by opening the switch element 29. The increased pressure in the manifold 13 causes outward movement of the membrane 21 from the position corresponding to the original tire pressure. If this outward movement is not sufficient to open the switch 19, the inflation control valve 12 is again opened by closing of the switch element 28. This cycle is repeated until the desired pressure is reached and the switch 19 is opened by the membrane 21.

The switch element 30 which shunts the switch 19 keeps the motor energized through the entire valve operation cycle except for a brief period in which the valves 12, 17 assume their original position illustrated in FIG. 1. The apparatus thus returns to its starting position when the pressure desired is reached, and shuts itself off.

Figure 2:
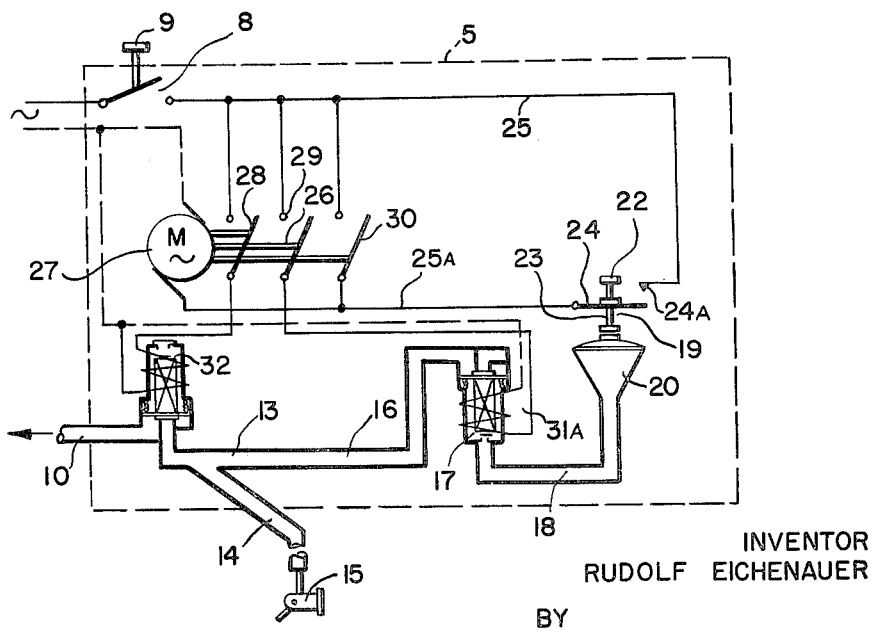
FIG. 2 is an analogous diagram for a device of the invention for deflating tires to a predetermined pressure.

The control device illustrated in FIG. 2 serves for deflating the excess pressure of tires to a predetermined pressure, an operation commonly employed for adjusting the internal pressure of newly mounted tubeless tires. The device is closely similar to that shown in FIG. 1, but it is not connected to a source of compressed air. The hose line 10 is open to the atmosphere. It is connected to a normally closed tire deflation control valve 32 which may be a conventional solenoid operated valve identical with the inflation control valve 12. The device of FIG. 2 differs from the inflation control apparatus of FIG. 1 by a modified pressure operated switch 19' whose contacts 24 and 24a are normally spaced from each other. The switch 19' is closed as long as the pressure in the pressure chamber 20 exceeds the desired tire pressure. All other illustrated control elements are identical with those described above in FIG. 1.

The cams actuated by the motor 27 are different from those employed in the first-described embodiment of the invention, and the device of FIG. 2 is operated as follows:

The connector 15 is attached to the tire to be deflated whereby the switch 19' is closed by the pressure in the chamber 20. The push button switch 8 is closed, and the motor 27 starts operating. It first closes the test valve 17. It then briefly opens the deflation control valve 32. The coil 31a of the test valve 17 is energized next to adjust the pressure in the chamber 20 to the lowered tire pressure, whereupon the cycle is repeated with the test valve closing and the deflation control valve thereafter opening until the pressure in the chamber 20 is no longer sufficient to maintain the switch 19' in its closed position. The tire now has reached the desired lower pressure set by adjustment of the pin 23, and the device is shut off when the holding circuit closed by the switch element 30 is opened in the manner described above.

It will be understood without further illustration that the switches 19, 19' may be connected with indicating devices which may show the pressure within the chamber 20 or which may produce an audible or visible signal responsive to the position of the movable contact element 24. The element 24 may itself be visually observed and may constitute means for indicating whether the tire being inflated or deflated has reached the desired condition.

FIG. 3 shows an additional embodiment of the invention comprising a pressure gage 38 equipped with fixed and movable electrical contacts which are opened and closed responsive to the sensed pressure. The gage 38 may replace the switches 19, 19' in the devices shown in FIGS. 1 and 2 as will be apparent to those skilled in the art.

The apparatus illustrated by the diagram of FIG. 3 is capable of simultaneously raising or lowering the pressure of two tires to a desired value, but may also be employed for adjusting the pressure of a single tire.

The apparatus of FIG. 3 is mounted on a common support, not further shown, in the same manner as described hereinabove. It includes four solenoid-operated valves including the normally closed inflation control valve 12, connected to a hose line 10 for supply of compressed air; a normally open testing valve 17; a normally closed deflation control valve 32; and an auxiliary, normally closed valve 42. A manifold 13' and respective branch conduits 14, 14', 41 and 16 connect the inflation control valve 12 with a connector 15, the deflation control valve 32, the auxiliary valve 42, and the testing valve 17. The deflation control valve 32 communicates with the atmosphere. The auxiliary valve 42 is interposed between the manifold 13 and a second tire connector 15a, and the testing valve 17 is connected to the pressure gage 38 by a conduit 18.

The timing switch 26a of the control device is equipped with four switch elements 28, 29, 30 and 30a, the latter being mechanically linked to the switch element 30. The device further includes an electrical reversing relay 40 having four single-pole double-throw switch elements 36, 50, 54 and 60. The apparatus is energized by a source 7 of preferably alternating current to permit the use of a simple synchronous gear motor 27 in the timing switch 26a. A push button switch 8 controls the current supply. Two additional manual switches 45, 46 and an electrically operated normally closed single-pole single-throw auxiliary switch 47 are also provided.

The motor 27, the coil 34 of the switch 47, the movable contact of the switch element 36, the coil of the reversing relay 40, and the solenoid coil 52 of the testing valve 17 are directly connected to the common return lead or ground 6b. The coil 43 of the valve 42 is grounded through the manual switch 45 and a conductor 44. These ground or return connections are indicated in FIG. 3 by broken lines.

The conductor 6a connects the main switch 8 to one contact in the secondary circuit of the auxiliary switch 47 and to a contact on the pointer 48 of the pressure gage 38 which will presently be described in more detail. A conductor 49 connects the other contact of the switch 47 with the normally closed fixed contact of the switch element 50, the normally open fixed contact of the switch element 60, and the four fixed contacts of the switch elements 28, 29, 30 and 30a. The switch 47 may be by-passed by closing the manual switch 46 which may directly connect the conductors 6a and 49.

One terminal of the motor 27 is connected to the movable contacts of the switch elements 30 and 50 by a conductor 51. The two terminals of the coil 57 of the solenoid valve 12 are respectively connected by the line 56 to the movable contact of the switch element 28 and by the line 61 to the normally connected fixed contact of the switch element 36. The movable contact of the switch element 29 is connected by the line or conductor 53 to the normally closed fixed contact of the switch element 54.

The deflation control valve 32 has one coil terminal connected to the normally open contact of the switch element 36 by the line 61a, whereas the other coil terminal is connected to the moving contact of the switch element 30a and the normally open fixed contact of the switch element 54 by the conductor 62. One terminal of the coil 43 of the valve 42 is connected by a conductor 55 to the movable contact of the switch element 54 and to a terminal of the coil 52 of the valve 17. A conductor 59 connects an adjustably fixed maximum contact 58 of the pressure gage 38 with the normally open fixed contact of the pressure switch 50 and the normally closed fixed contact of the switch element 60. The movable contact of the switch element 60 is connected to the coil of the reversing relay 40.

The pressure gage 38, which may be of any conventional type, has three terminals. One is connected to the conductor 6a and to the contact arranged on the pointer 48 of the gage. The second terminal is connected to one terminal of the coil or primary circuit 34 of the auxiliary switch 47 and to a contact 63 against which the pointer 48 abuts at a pressure near atmospheric pressure and substantially lower than the range of tire pressures to be controlled. The third terminal is connected to the conductor 59 as described above and to an adjustable contact 58 which is conductively engaged by the pointer 48 at all pressures higher than the desired pressure. In the example illustrated in FIG. 3, the contact 58 has the shape of a ring segment and may be rotated about the axis of rotation of the pointer 48 for setting the ultimate tire pressure. The contact 58 may be of the trailing type, and resiliently movable in contact with the pointer 48 between its set position and positions correlated to higher pressure values, so that the contact in interrupted when the pointer 48 drops below the set value. The gage 38 closes two different circuits at predetermined maximum and minimum pressures.

The apparatus illustrated in FIG. 3 operates as follows to raise the pressure of an insufficiently inflated tire:

When the main switch 8 is closed, the coil 34 is energized and the auxiliary switch 47 is opened, thus making the device ready for operation. When the pressure of only one tire is to be adjusted, the connector 15 is attached to the tire valve. Air under pressure flows through the branch conduits 14 and 16 and the valve 17 into the pressure gage 38 whereby the pointer 48 is moved away from the contact 63. The circuit of the coil 34 is interrupted and the switch 47 is again closed. The pointer 48 indicates the pressure prevailing in the tire on a suitable scale, not shown. Current now flows over the switch 47, the conductor 49, the switch element 50 of the reversing relay 40, and the line 51 to the motor 27. The timing switch 26a is started.

The switch element 29 is first closed and energizes the coil 52 of the testing valve 17 by way of the conductors 49, 53, and 55, and the switch element 54. The valve 17 is shut. Reference may now be had to FIG. 4 in which the bars 12, 17 respectively indicate the consecutive conditions of the valves 12, 17 progressing from the left to the right, simultaneous conditions of the two valves being indicated by superposed portions of the bars. The shaded bar portions indicate that the respective valve is open, whereas the blank portions show the valve to be shut. The portions of the bars 12, 17 extending from A to B correspond to the part of the operating cycle described above in which the inflation control valve 12 is closed and the testing valve 17 is open until the point B is reached at the moment when the coil 52 is energized. Both valves are now closed.

The cam associated with the motor 27 next closes the switch element 28 so that the coil 57 of the inflation control valve 12 is energized and the valve is opened against the air pressure in the line 10. Opening of the valve 12 is indicated at C in FIG. 4. The valve remains open for a short period represented by the distance C–D in FIG. 4. While both valves are closed simultaneously for a relatively long span (D–B$_1$), the pressure in the tire and in the branch conduit 14 is equalized. At time B$_1$ a new cycle begins as from A in FIG. 4 with the opening of the valve 17 by the switch element 29 deenergizing the coil 52. Alternate opening of the valves 12 and 17 is repeated until the pointer reaches a position of contact with the adjustable maximum contact 58 whereby current flowing over the switch element 60 momentarily energizes the reversing relay 40, and the switch elements 36, 50, 54, and 60 are moved into the respective positions indicated in FIG. 3 by broken lines.

The relay is maintained in its reversing position by a holding circuit including the switch element 60, the conductor 49, and the switch 47. The line 61 is disconnected from the return lead 6b and the coil 57 of the inflation control valve 12 is deenergized. The deflation control valve 32 is opened when its coil is energized by closing of the switch element 30a of the timing switch 26a while the switch elements 36 and 54 are in the positions indicated in broken lines. Simultaneously the testing valve 17 is closed as the conductor 55 is connected to the power lead 6a by the switch element 30a. The positions of valves 17 and 32 now are as indicated at E in FIG. 5 in a manner analogous to the showing of FIG. 4. Alternate simultaneous opening and closing of valves 17 and 32 continues as diagrammatically illustrated in FIG. 5 by operation of the switch element 30a until the decreasing tire pressure causes the pointer 48 to lose contact with the ring segment 58, that is, at the desired pressure.

Any small amount of excess pressure in the tire after inflation is thus relieved. The motor 27 is kept running by a holding circuit including the switch element 30. Because of the mechanical linkage between the switch elements 30 and 30a, the motor 27 can come to a halt only after the deflation control valve 32 has been closed, that is, its coil has been deenergized by opening of the element 30a.

The reversing relay 40 remains in its reversed position even after the motor 27 stops. When the connector 15 is removed from the tire valve, the pressure in the gage 38 drops to atmospheric pressure and the pointer 48 touches the contact 63, thereby opening the switch 47. The coil of the relay 40 is deenergized and the relay returns its switch elements to the fully drawn inital positions. The control device is ready again automatically to operate when a tire valve is attached to the connector 15. This readiness for automatic operation is maintained as long as the main switch 8 remains closed.

If the tire to be inflated is completely empty of air under superatmospheric pressure, the switch 47 may be by-passed by closing the manual switch 46 whereby the motor 27 is started regardless of the position of the pointer 48.

As will be readily understood, the reversing relay is energized at once if a tire having a higher air pressure than that desired is attached to the connector 15. The first part of the afore-described cycle of operations is thereby eliminated, and the excess pressure is relieved in the manner illustrated in FIG. 5.

If two tires are to be inflated or deflated to the same pressure simultaneously, the switch 45 is closed and the coil 43 of the auxiliary valve 42 is connected to the return lead 6b. The first tire is attached to the connector 15a and the second tire to the connector 15. The apparatus is in the condition shown at F in FIG. 6 and corresponding to A in FIG. 4. The testing valve 17 initially is in its normal open position, and the inflation control valve 12 is closed. When the connector 15 admits air under pressure from the second tire to the pressure gage 38, the control device is automatically started as described above, and a cycle corresponding to that of FIG. 4 is started.

As is evident from FIG. 3, the coil 43 of the auxiliary valve 42 is arranged in parallel with the coil 52 of the testing valve 17, the normally closed auxiliary valve 42 is open whenever the normally open testing valve 17 is closed, and vice versa. The auxiliary valve 42 thus opens at the time represented by G in the diagram of FIG. 6 when the valve 17 closes, and remains open during the period from H to J when the inflation control valve 12 admits air into the manifold 13. Both tires are thereby inflated. When the testing valve 17 opens at K, the auxiliary valve 42 is shut. It is opened again at L with the closing of the testing valve 17. Since the pressure in both tires has an opportunity of equalizing between the moment of closing of the inflation control valve 12 at J and the moment of opening of the testing valve 17, the pressure of the second tire connected to the pressure gage 38 by the valve 17 is representative of both tires. When the testing valve 17 is closed at L, the device is returned to the same condition as at G. One or more additional cycles are automatically repeated until both tires reach the same desired pressure, whereupon inflation is automatically terminated.

It is evident that as many auxiliary valves 42 and co-ordinated connectors 15a may be arranged in parallel with the testing valve 17 to inflate any desired number of tires to the same pressure at the same time. It is equally possible to deflate simultaneously a plurality of tires containing excess air with the apparatus of FIG. 3, as will be apparent to those skilled in the art without further explanation.

In its most universally applicable form illustrated in FIG. 3, the apparatus of the invention is capable of controlling the inflation or deflation of one or more tires to a predetermined pressure in an entirely automatic manner. Inflation or deflation, whichever may be required, is automatically started by merely attaching a connector of the apparatus to each tire the pressure of which is to be adjusted, and by disconnecting the tire from the apparatus when a gage or mere stopping of the motor in the control device indicates that the desired pressure has been reached. The apparatus automatically returns itself to the initial condition and is immediately available for another inflation or deflation operation.

The conduits leading from the tires to the control elements of the device are represented in the drawing by the branch conduits 14, 14'. They may be of any length without affecting the precision of operation of the apparatus. A delay between admission of each individual portion of compressed air and testing of the pressure reached permits pressure equalization throughout the control device, and this delay may readily be controlled to compensate for unusual length of a branch conduit 14. Without such a delay, the pressure sensed by the pressure gage or other pressure sensitive element of the apparatus could be higher than that actually present in the tire being inflated, and the admission of compressed air would be discontinued prematurely.

The pressure sensitive element of the device is sealed off while air or other pressure fluid is admitted to the tire or released therefrom to the atmosphere. The sensitive element thus is not exposed to the relatively large local pressure changes involved in such admission or release. It follows only the relatively minor changes between successive stable pressure states when pressure fluid is neither admitted to nor withdrawn from the tire. The pressure sensitive element quickly assumes a condition correlated to the minor change without overshooting. Damping which inherently impairs the sensitivity of the pressure sensitive element is unnecessary, and the time of element adjustment is extremely short. The testing period of each control cycle can be held to a minimum without impairing the accuracy of the device.

The advantages of inflating two or more tires of an automotive vehicle to precisely the same pressure are well known. Such uniform inflation can be performed with the apparatus of the invention in an extremely simple and reliable manner.

It should be understood of course that the foregoing disclosure relates to only a preferred embodiment of the invention and that it is intended to cover all changes and modifications of the examples of the invention herein chosen for the purpose of the disclosure which do not constitute departures from the spirit and scope of the invention set forth in the appended claims.

What is claimed is:

1. In an apparatus for adjusting fluid pressure in a vehicular tire and like container, in combination:
   (a) a normally closed first valve;
   (b) first electrically operated valve actuating means for opening and closing said first valve;
   (c) a conduit communicating with said first valve;
   (d) manifold means communicating with said valve for passage of fluid between said conduit and said manifold means when said valve is open;
   (e) a tire valve connector permanently communicating with said manifold means;
   (f) pressure sensitive switch means for opening and closing an electric circuit responsive to a difference between a sensed fluid pressure and a predetermined fluid pressure;
   (g) a normally open second valve operatively interposed between said manifold means and said pressure sensitive switch means for sensing of the fluid pressure in said manifold means when said second valve is open;
   (h) second electrically operated valve actuating means for closing and opening said second valve;
   (i) a source of electric current;
   (j) time switch means in circuit with said source and with said first and second valve actuating means for cyclically closing said second valve, opening said first valve, closing said first valve, and opening said second valve in timed sequence; and
   (k) time switch actuating means in circuit with said pressure sensitive switch means for actuating said time switch means when the fluid pressure sensed by said pressure sensitive switch means differs from said predetermined pressure.

2. In an apparatus as set forth in claim 1, a source of fluid under a pressure higher than said predetermined pressure and communicating with said conduit, said time switch actuating means being adapted to actuate said time switch means when the fluid pressure sensed by said pressure sensitive switch means is lower than said predetermined pressure.

3. In an apparatus as set forth in claim 1, said conduit being open to the atmosphere, and said time switch actuating means being adapted to actuate said time switch means when the fluid pressure sensed by said pressure sensitive switch means is higher than said predetermined pressure.

4. In an apparatus as set forth in claim 1, said pressure sensitive switch means including indicating means for indicating the pressure sensed.

5. In an apparatus as set forth in claim 1, said time switch actuating means including an electric motor in circuit with said pressure sensitive switch means and said source of electric current for energizing said motor when the pressure sensed by said pressure sensitive switch means is different from said predetermined pressure.

6. In an apparatus as set forth in claim 5, said time switch means including a third timing switch in holding circuit with said source of current and said motor for keeping the same energized independently of said pressure sensitive switch means until said first and second valves are in the respective normal positions thereof.

7. In an apparatus as set forth in claim 1, an electrically operated auxiliary switch having a primary and a secondary circuit, said time switch means including an electric motor and first and second timing switches actuated by said motor and respectively arranged in circuit with said first and second valves for opening and closing the same in said timed sequence when said motor is energized, the primary circuit of said auxiliary switch being connected to said pressure-sensitive switch means and said source of current for opening the secondary circuit of said auxiliary switch means when the pressure sensed by said pressure sensitive switch means is lower than a fixed minimum pressure, said motor being connected to said source of current by said secondary circuit.

8. In an apparatus as set forth in claim 1, said time switch means including means for opening said second valve with a predetermined delay after the closing of said first valve in said sequence.

9. In an apparatus as set forth in claim 8, said delay being longer than the time between the opening and the closing of said first valve in said sequence.

10. In an apparatus for adjusting fluid pressure in a vehicular tire and like container, in combination:
(a) manifold means;
(b) a source of fluid under pressure;
(c) a normally closed inflation control valve operatively interposed between said source and said manifold means;
(d) first electrically operated valve actuating means for opening and closing said inflation control valve;
(e) a conduit open to the atmosphere;
(f) a normally closed deflation control valve operatively interposed between said conduit and said manifold means;
(g) second electrically operated valve actuating means for opening and closing said deflation control valve;
(h) connector means permanently communicating with said manifold means for connecting the same to a container;
(i) pressure sensitive switch means for opening and closing at least one electric circuit responsive to a difference between a sensed fluid pressure and a predetermined pressure;
(j) a normally open testing valve operatively interposed between said switch means and said manifold means;
(k) third electrically operated valve actuating means for closing and opening said testing valve;
(l) a source of electric current;
(m) time switch means in circuit with said source of electric current and with said valve actuating means for cyclically closing said testing valve, opening said inflation control valve, closing said inflation control valve, and opening said testing valve in a first timed sequence while keeping said deflation control valve closed; and for closing said testing valve, opening said deflation control valve, closing said deflation control valve, and opening said testing valve in a second timed sequence while keeping said inflation control valve closed; and
(n) time switch actuating means in circuit with said source of electric current and with said pressure sensitive switch for actuating said time switch means in said first sequence when the fluid pressure sensed by said pressure sensitive switch means is lower than said predetermined pressure, and for actuating said time switch means in said second sequence when the fluid pressure sensed by said pressure sensitive switch means is higher than said predetermined pressure.

11. In an apparatus as set forth in claim 10, said time switch means including means for opening said testing valve with a predetermined delay after the closing of said inflation control valve in said first time sequence.

12. In an apparatus as set forth in claim 11, said delay being longer than the time between the opening and the closing of said inflation control valve in said first timed sequence.

13. In an apparatus as set forth in claim 10, said pressure sensitive switch means including a contact movable responsive to a fluid pressure sensed by the last named switch means, a maximum and a minimum contact arranged for closing respective maximum and minimum circuits with said movable contact when said sensed pressure reaches predetermined maximum and minimum values, said time switch actuating means being arranged in circuit with said contacts of said pressure sensitive switch means for actuating said time switch means in said first timed sequence when said sensed pressure is intermediate said maximum and minimum values, and for actuating said time switch means in said second timed sequence when said sensed pressure is higher than said maximum value.

14. In an apparatus as set forth in claim 13, said time switch actuating means including an electric motor, and said time switch means including a plurality of timing switches connected to said motor for operation thereby, and relay means including at least one switch element, said timing switches and said switch element being arranged in circuit with said source of current and with said valves for operating the same, said switch element being connected to said source of current, one of said timing switches, said inflation control valve, and said deflation control valve for selectively connecting one of the last-named two valves to said source through said one timing switch.

15. In an apparatus as set forth in claim 14, circuit means connecting said relay to said contacts of said pressure sensitive switch means for connecting said inflation control valve to said source through said one timing switch when said sensed pressure is intermediate said maximum and minimum values, and for connecting said deflation control valve to said source of current through said one timing switch when said sensed pressure is higher than said maximum value.

16. In an apparatus as set forth in claim 13, an electrically operated auxiliary switch having a primary and a normally closed secondary circuit, the primary circuit of said auxiliary switch being connected to said minimum contact and said source of current for interrupting said secondary circuit when said sensed pressure reaches said minimum value, said time switch actuating means including an electric motor, and said time switch means including a plurality of timing switches actuated by said motor for operating said valves in said first sequence and said second sequence, said motor being arranged in series with said second circuit and said source of current.

17. In an apparatus as set forth in claim 10, another tire valve connector, an electrically operated normally closed auxiliary valve interposed between said manifold means and said other tire valve connector, and conductor means connecting said auxiliary valve to said testing valve for connecting said auxiliary valve to said source of current simultaneously with said testing valve.

18. In a method of adjusting the fluid pressure in a vehicular tire and like container to a desired pressure, in combination:
(a) connecting one end portion of an elongated conduit to pressure-sensitive switch means for sensing of said pressure by said switch means;
(b) connecting the other end portion of said conduit to the container to be adjusted for a period sufficient to equalize the pressure in said container and in said switch means;
(c) sealing a portion of said conduit intermediate said end portions for substantially maintaining said equalized pressure in said switch means, said desired pressure differing from said equalized pressure in a given direction;
(d) connecting the other end portion of said conduit to a source of fluid pressure different from said equalized pressure for adjusting the pressure in said container in said direction;
(e) sealing said source of fluid pressure from said other end portion for a period sufficient to equalize the adjusted pressure in said container and in said other end portion;

(f) unsealing said intermediate portion of said conduit for connecting said end portions and for sensing the adjusted equalized pressure;

(g) repeating the sequence of sealing said intermediate portion, of connecting said other end portion to said source, of sealing said source from said other end portion, and of unsealing said intermediate portion until the sensed adjusted equalized pressure is substantially equal to said predetermined pressure; and (h) sealing said source from said conduit responsive to the said sensed substantially equal pressure.

19. In a method as set forth in claim 18, said other end portion being substantially longer than said one end portion.

References Cited by the Examiner

UNITED STATES PATENTS

| | | | |
|---|---|---|---|
| 2,185,394 | 1/1940 | Arbogast | 137—624.17 X |
| 2,363,177 | 11/1944 | Hoffner | 137—1 |
| 2,788,795 | 4/1957 | Eichenauer | 137—224.5 |
| 2,818,080 | 12/1957 | Eichenauer | 137—229 X |
| 2,818,081 | 12/1957 | Eichenauer | 137—299 X |
| 2,858,496 | 10/1958 | Davis | 137—624.17 X |
| 3,034,526 | 5/1962 | Roselle | 137—1 |

ISADOR WEIL, *Primary Examiner.*

MARTIN P. SCHWADRON, *Examiner.*

D. LAMBERT, R. MASSENGILL, *Assistant Examiners.*